United States Patent
Tao

(10) Patent No.: US 10,393,205 B2
(45) Date of Patent: Aug. 27, 2019

(54) DOUBLE-LIFT RIGID GAS SPRING

(71) Applicant: CHANGZHOU LANT GAS SPRING CO., LTD., Changzhou (CN)

(72) Inventor: Shengrong Tao, Changzhou (CN)

( * ) Notice: Subject to any disclaimer, the term of this patent is extended or adjusted under 35 U.S.C. 154(b) by 0 days.

(21) Appl. No.: 15/815,215

(22) Filed: Nov. 16, 2017

(65) Prior Publication Data

US 2018/0355938 A1    Dec. 13, 2018

(30) Foreign Application Priority Data

Jun. 8, 2017   (CN) .................... 2017 2 0665854 U

(51) Int. Cl.
*F16F 9/16*   (2006.01)
*F16F 9/06*   (2006.01)
*F16F 9/32*   (2006.01)
*F16F 9/50*   (2006.01)

(52) U.S. Cl.
CPC ................ *F16F 9/16* (2013.01); *F16F 9/062* (2013.01); *F16F 9/063* (2013.01); *F16F 9/067* (2013.01); *F16F 9/3214* (2013.01); *F16F 9/3235* (2013.01); *F16F 9/50* (2013.01)

(58) Field of Classification Search
CPC .... F16F 9/16; F16F 9/062; F16F 9/063; F16F 9/067; F16F 9/3214; F16F 9/3235; F16F 9/50; F16F 9/06; F16F 9/34; F16F 9/32
See application file for complete search history.

(56) References Cited

U.S. PATENT DOCUMENTS 4,647,026 A * 3/1987 Siemann ................. F16F 9/516
                                                      188/281

FOREIGN PATENT DOCUMENTS

CN            202402546 U        8/2012

\* cited by examiner

*Primary Examiner* — Melanie Torres Williams
(74) *Attorney, Agent, or Firm* — W&K IP

(57) ABSTRACT

A double-lift rigid gas spring is invented. It includes an outer cylinder tube, an inner cylinder tube, a ventilated support, a valve body, and a control component. It has benefits: during working, gas pressure is released to push the liquid medium to enter the inner cylinder tube and the hollow piston rod.

4 Claims, 3 Drawing Sheets

DOUBLE-LIFT RIGID GAS SPRING

CROSS-REFERENCE TO RELATED APPLICATIONS

This application claims priority to Chinese Patent Application No. 201720665854.0 with a filing date of Jun. 8, 2017. The content of the aforementioned applications, including any intervening amendments thereto, are incorporated herein by reference.

TECHNICAL FIELD

The utility model relates to a double-lift rigid gas spring.

BACKGROUND OF THE PRESENT INVENTION

A gas spring mainly consists of a cylinder tube, a piston in the cylinder tube, a piston rod, a valve rod and so on; gas and oil liquid are stored in the cylinder tube. Since the piston occupies the volume in the cylinder tube, the piston is compressed into the cylinder tube when working, then the piston moves in the axial direction in the cylinder tube to press the oil liquid, then the oil liquid compresses the gas so that the piston reaches the working position; when the external force loaded on the piston rod is removed, the gas recovers and expands, and the expanded gas pushes the oil liquid to reset the piston and move out the piston rod, so that the gas spring realizes a compression motion and a restoration damping motion.

The utility model with application number of CN202402546U discloses a lifting gas spring of a rigid locking seat, as shown in FIG. 2, including a cylinder tube 5, a piston rod 1, a valve body 10 and a valve core 11; a guide sleeve 2 and a guide sealing ring 3 are sleeved on the piston rod 1 and are installed in the cylinder tube 5, one end of the piston rod 1 penetrates out the cylinder tube 5 and the other end has a piston 8, an inner annular tube 6 is fixed in the cylinder tube 5 through a front support 4 having damping air holes 4-1 at two ends and a valve body 10 having a damping oil hole 10-1, the piston 8 is arranged in the inner annular tube 6 in sealing mode and divides the inner annular tube 6 into a front inner gas cavity 18 and a rear inner oil cavity 16, the valve body 10 is connected with the cylinder tube 5 and the inner annular tube 6 in sealing mode, the valve core 11 is installed on the valve body 10 through an abrasion resistant sleeve 15, an oil hole 15-1 is arranged on the abrasion resistant sleeve 15, a valve cover at the front end of the valve core 11 corresponds to a valve seat 9 on the valve body 10, the rear end of the valve core 11 penetrates out the valve body 10 to correspond to a starting rod 13, the starting rod 13 is installed on the rear portion of the cylinder tube 5 through a rear support 12, a floating separator piston 7 is installed between the cylinder tube 5 and the inner annular tube 6 in sealing mode and divides the cavity between the cylinder tube 5 and the inner annular tube 6 into a front outer gas cavity 19 and a rear outer oil cavity 17, the front inner gas cavity 18 is communicated with the front outer gas cavity 19 through the damping air hole 4-1 arranged on the front support 4, and the rear outer oil cavity 17 is communicated with the rear inner oil cavity 16 through the damping oil hole 10-1 on the valve body 10 and the oil hole 15-1 on the abrasion resistant sleeve 15.

As for the above gas spring, the maximum extension length of the piston rod 1 is less than the length of the piston rod 1; in some situations that need bigger extension length, if the above gas spring is to meet corresponding requirements, the sizes of the inner cylinder tube, the outer cylinder tube and the piston rod must be increased, so as to increase the extension length of the piston rod; however, this method makes the gas spring difficult to apply to many occasions, for example, the gas spring with long size cannot apply to occasions that need short travel, while the gas spring with short size cannot apply to occasions that need long travel, consequently each occasion needs a gas spring of one size.

SUMMARY OF PRESENT INVENTION

In view of the above technical problem, the utility model provides a double-lift rigid gas spring applicable to many occasions.

The double-lift rigid gas spring includes: an outer cylinder tube provided with openings at two ends, one end of the outer cylinder tube being provided with a first plug having a first through hole and the other end of the outer cylinder tube being provided with a second plug having a second through hole;

an inner cylinder tube located inside the outer cylinder tube and provided with openings at two ends, a floating separator piston being arranged between the inner cylinder tube and the outer cylinder tube;

a ventilated support fixed with one end of the inner cylinder tube, the ventilated support being matched with the outer cylinder tube;

a valve body, one end of the valve body being located in the outer cylinder tube and provided with a first sealing element and the other end of the valve body being inserted into the other end of the inner cylinder tube and provided with a second sealing element, and on the valve body being provided a first hole allowing a liquid medium to flow through and a second hole communicated with first hole, the first hole being arranged along the radial direction of the valve body and the second hole being arranged along the axial direction of the valve body;

a control component controlling the liquid medium to flow through the valve body, one end of the control component blocking the second hole under the pressure of the liquid medium, and the other end of the control component passing through the second plug to be exposed to air;

the double-lift rigid gas spring further includes: a hollow piston rod, one end of the hollow piston rod being fixed with a first separator piston, the first separator piston being matched in the inner cylinder tube, the first separator piston being provided with a through hole for communicating the hollow piston rod and the inner cylinder tube, and the other end of the hollow piston rod extending outside the outer cylinder tube after passing through the inner cylinder tube and the first plug in turn; and a piston rod, one end of the piston rod being fixed with a second piston and located in the hollow piston rod and the other end of the piston rod being exposed to air after passing through the hollow piston rod.

The benefits of the disclosure are as follows: during working, gas pressure is released to push the liquid medium to enter the inner cylinder tube and the hollow piston rod, so that the hollow piston rod and the piston rod extend together; when the hollow piston rod extends to the maximum travel, as gas pressure continues being released, the liquid medium continues flowing into the hollow piston rod, thereby pushing the piston rod to continue extending; when the piston rod extends to the maximum travel, the total extension length of the gas spring is the sum of the extension lengths of the hollow piston rod and the piston rod; therefore, the gas spring in the utility model doubles the travel; for gas springs having the same cylinder tube size, the extension length of the double-lift rigid gas spring in the utility model is twice that of the gas spring of the same cylinder tube size; the gas spring of such structure can meet the usage requirements of more occasions without changing the cylinder tube size.

DESCRIPTION OF DESIGNATORS IN FIG. 1 represents an outer cylinder tube, 2 represents a first plug, 3 represents a second plug, 4 represents an inner cylinder tube, 5 represents a floating separator piston, 6 represents a hollow piston rod, 6a represents a first separator piston, 6b represents an axial extension portion, 6c represents a through hole, 6d represents a piston rod, 6e represents a second piston, 6f represents a third piston, 7 represents a ventilated support, 7a represents a radial extension portion, 8 represents a bracket, 9 represents a valve body, 9a represents a first sealing element, 9b represents a second sealing element, 9c represents a first hole, 9d represents a second hole, 9e represents a spacer bush, 9f represents a sealing ring, 10 represents a control component, and 10a represents a projection.

DETAILED DESCRIPTION OF PREFERRED EMBODIMENTS

Figure 1:
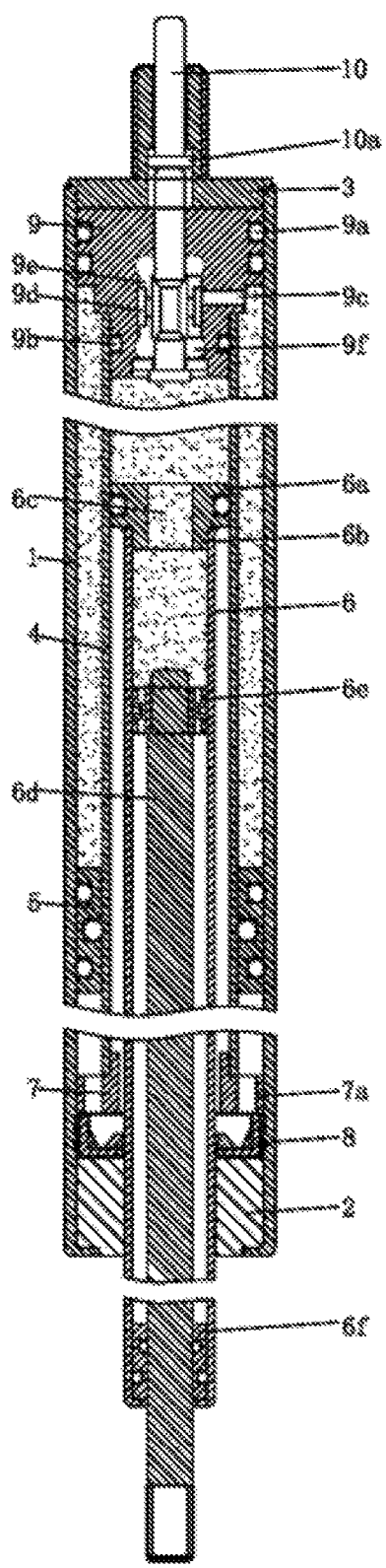
FIG. 1 is a diagram illustrating a sectional structure of a first double-lift rigid gas spring of the disclosure.
Figure 2:
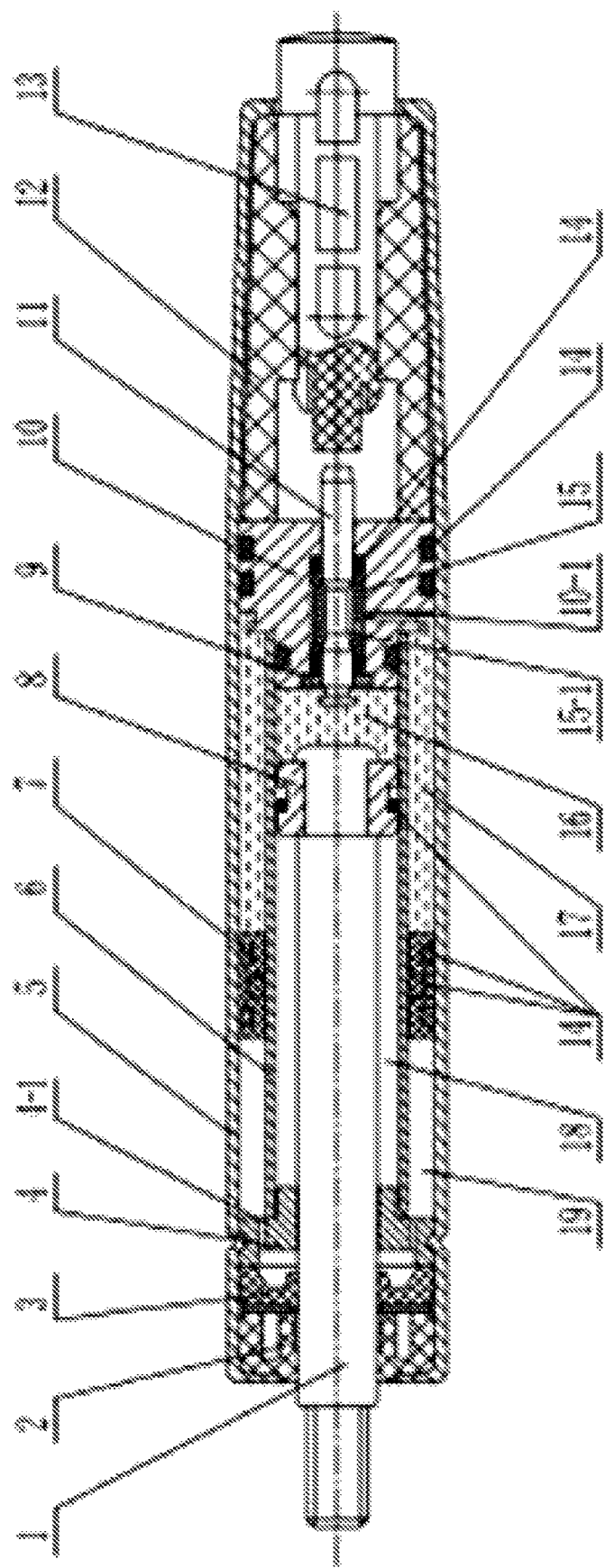
FIG. 2 is a diagram illustrating a lifting gas spring of a rigid locking seat in existing technologies.
Figure 2:
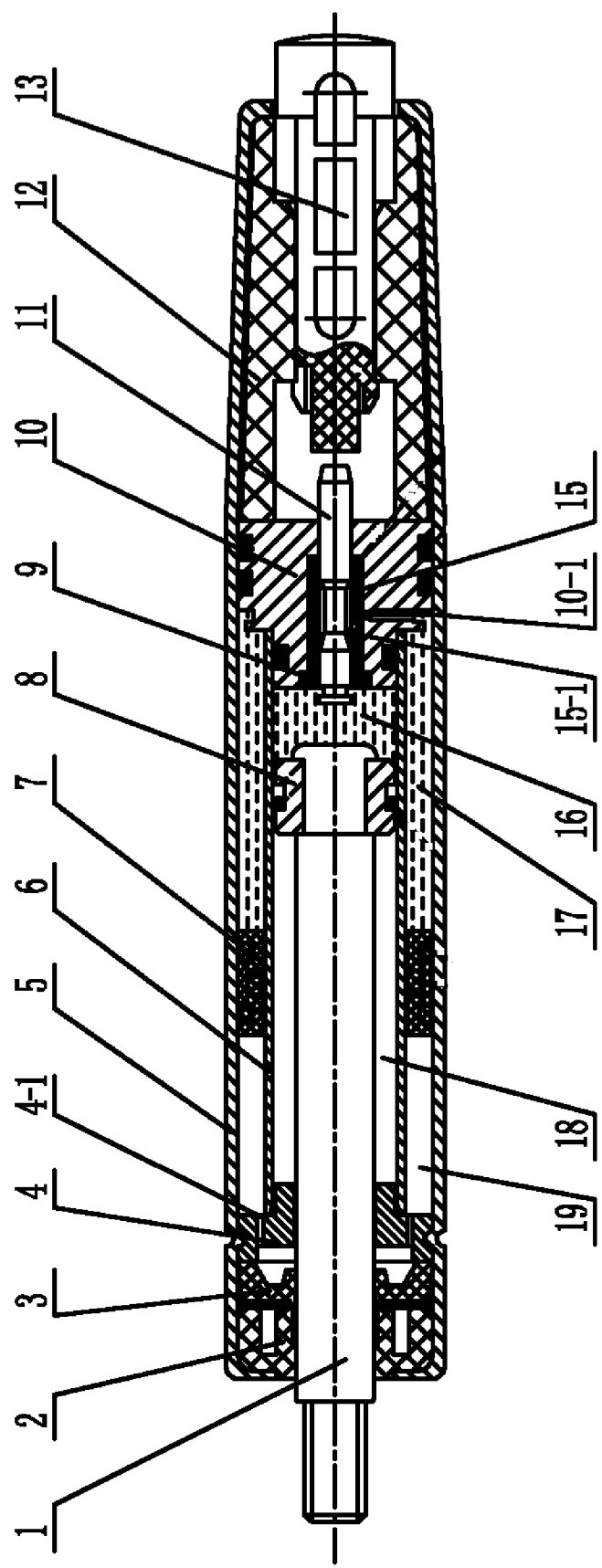

As shown in FIG. 1, the double-lift rigid gas spring, of the disclosure includes an outer cylinder tube, an inner cylinder tube, a floating separator piston, a hollow piston rod, a piston rod, a third piston and a valve body; the structure of each part and the relationship among the parts are described below in detail.

The outer cylinder tube 1 is provided with openings at two ends, one end of the outer cylinder tube 1 is provided with a first plug 2 having a first through hole and the other end of the outer cylinder tube is provided with a second plug 3 having a second through hole the first plug 2 and the second plug 3 preferably are in interference fit with the outer cylinder tube 1. The inner cylinder tube 4 is provided with openings at two ends and the inner cylinder tube 4 is located inside the outer cylinder tube.

The floating separator piston 5 is arranged between the inner cylinder tube and the outer cylinder tube, the floating separator piston 5 divides the outer cylinder tube 1 into two regions, the region located on one side of the floating separator piston 5 is loaded with a liquid medium, specifically, the region is loaded with oil, and the region located on the other side of the floating separator piston 5 is loaded with gas, specifically, the region is loaded with nitrogen gas. The floating separator piston 5 can move along the axial direction of the outer cylinder tube 1 when the pressures in the regions on the two sides are changed.

One end of the hollow piston rod 6 is fixed with a first separator piston 6a, the first separator piston 6a is matched in the inner cylinder tube 4, one end of the first separator piston 6a connected with the hollow piston rod 6 is provided with an axial extension portion 6b, and the axial extension portion 6b is inserted into the hollow piston rod 6. Through the first separator piston 6a, the end of the hollow piston rod 6 is supported, The first separator piston 6a is provided with a through hole 6c for communicating the hollow piston rod and the inner cylinder tube, and the other end of the hollow piston rod 6 extends outside the outer cylinder tube to be exposed to air after passing through the inner cylinder tube 4 and the first plug 2 in turn. Through the hollow piston rod 6 and the first separator piston 6a arranged on the hollow piston rod 6, the inner cylinder tube 4 is divided into two regions; the region located on one side of the first separator piston 6a is loaded with a liquid medium (for example, oil), the region located on the other side of the first separator piston 6a is loaded with gas (for example, nitrogen gas); when the pressures in the regions on the two sides are changed, the hollow piston rod 6 and the first separator piston 6a can move along the axial direction of the inner cylinder tube 4, so that the piston rod 6 produces an action of stretching or retracting, thereby driving a load connected with the end part of the piston rod 6 exposed to air to generate a corresponding action, for example, the raising or lowering of the load in the longitudinal direction, or the feeding or retracting of the load in the horizontal direction.

One end of the piston rod 6d is fixed with a second piston 6e and located in the hollow piston rod 6, the second piston 6e and the hollow piston rod 6 are in transition fit, the other end of the piston rod 6d is exposed to air after passing through the hollow piston rod 6. The third piston 6f is located in the hollow piston rod 6 and the third piston 6f is eyed on the piston rod 6d.

A ventilated sup port 7 is fixed with one end of the inner cylinder tube 4, and the ventilated support 7 is matched with the outer cylinder tube 1. One end of the ventilated support 7 is located in the inner cylinder tube 4, a central hole is arranged on the ventilated support 7, the piston rod 6 passes through from the central hole on the ventilate support 7, so that the piston rod 6 is in clearance fit with the ventilated support 7; a radial extension portion 7a is arranged on the ventilated support 7, the other end of the ventilated support 7 is located outside the inner cylinder tube 4, the radial extension portion 7a is arranged on the portion of the ventilated support 7 located outside the inner cylinder tube 4, the radial extension portion 7a is matched with the outer cylinder tube 1, in this way, the inner cylinder tube 4 is supported through the ventilated support 7 in the outer cylinder tube 1; an air hole is arranged on the radial extension portion 7a, the air hole allows the region of the outer cylinder tube 1 loaded with gas to be communicated with the region of the inner cylinder tube 4 loaded with gas, so that, after the ventilate support 7 is installed, the regions of the outer cylinder tube 1 and the inner cylinder tube 4 loaded with gas are not clogged. A space or gap is arranged between the ventilated support 7 and the first plug 2; when there is a space, the disclosure arranges a bracket 8 decided with a sealing element between the ventilated support 7 and the first plug 2, so that a cavity is formed between the ventilated support 7 and the bracket 8, allowing the gas to smoothly flow between the region of the outer cylinder tube 1 loaded with gas and the region of the inner cylinder tube 4 loaded with gas.

The valve body 9 is pressed between the inner cylinder tube and the second plug 3. One end of the valve body 9 is located in the outer cylinder tube and provided with a first sealing element 9a and the other end of the valve body 9 is located in the inner cylinder tube and provided with a second sealing element 9b, and on the valve body 9 is provided a first hole 9c allowing a liquid medium to flow through and a second hole 9d communicated with first hole, the first hole 9c is arranged along the radial direction of the valve body 9 and the second hole 9d is arranged along the axial direction of the valve body 9; a spacer bush 9e is arranged in the second hole 9d, the spacer bush 9e is provided with an opening allowing the liquid medium to flow through, sealing rings 9f which are located on two ends of the spacer bush 9e are further arranged in the second hole 9d. The liquid medium in the outer cylinder tube 1 is sealed through the first sealing element 9a, avoiding that the liquid medium in the outer cylinder tube 1 flows out through the gap between the valve body 9 and the outer cylinder tube. The liquid medium in the inner cylinder tube 4 is sealed through the second sealing element 9b, avoiding that the liquid medium in the inner cylinder tube 4 flows between the region of the outer cylinder tube 1 loaded with liquid medium and the region of the inner cylinder tube 4 loaded with liquid medium when not controlled by the valve body 9 and the control component 10.

The control component 10 controls the liquid medium to flow through the valve body, the control component 10 is rod shaped, and one end of the control component 10 blocks the second hole under the pressure of the liquid medium. The control component includes a rod shaped valve core and a switch, and one end of the valve core presses against one end of the switch.

The control component 10 is operated to enable the switch to push the valve core, thereby opening the second hole on the valve body 9 and allowing the regions of the inner cylinder tube 4 and the outer cylinder tube 1 loaded with liquid mediums to be communicated; when the floating separator piston 5 is under the action of the gas pressure of the region loaded with gas, the liquid medium flows into the inner cylinder tube 4 and the hollow piston rod 6, thereby pushing the hollow piston rod 6 and the piston rod 6d to extend; when the first separator piston 6a presses against the ventilated support 7, the hollow piston rod 6 cannot move any longer; when the hollow piston rod 6 extends to the maximum travel, as gas pressure continues being released, the liquid medium continues flowing into the hollow piston rod 6, thereby pushing the piston rod 6d to continue extending; when the piston rod 6d extends to the maximum travel, the total extension length of the gas spring is the sum of the extension lengths of the hollow piston rod 6 and the piston rod 6d; therefore, the gas spring in the utility model doubles the travel; as for the gas spring of the same height, when the piston rod is compressed to the lowest point, the lowest point can be very low, probably one time lower than that of the gas spring of the same travel. The maximization of travel enables the double-lift rigid gas spring to be applicable to a wider range of applications and solves the limitation in the travel of the cylinder body of the same length in existing technologies.

This double-lift rigid locking gas pressure rod has no elasticity when self-locked, and may be widely applied to office furniture including office chairs, office tables, etc., medical appliances, fitness equipment, household furniture including barstool, coffee table, etc., automobile gas springs and various mechanical equipment that need rigid telescopic adjustment, with wider application scope.

I claim:

1. A double-lift rigid gas spring, comprising: an outer cylinder tube provided with openings at two ends, one end of the outer cylinder tube being provided with a first plug having a first through hole and the other end of the outer cylinder tube being provided with a second plug having a second through hole;
   an inner cylinder tube located inside the outer cylinder tube and provided with openings at two ends, a floating separator piston being arranged between the inner cylinder tube and the outer cylinder tube;
   a ventilated support fixed with one end of the inner cylinder tube, the ventilated support being matched with the outer cylinder tube;
   a valve body, one end of the valve body being located in the outer cylinder tube and provided with a first sealing element and the other end of the valve body being inserted into the other end of the inner cylinder tube and provided with a second sealing element, and on the valve body being provided a first hole allowing a liquid medium to flow through and a second hole communicated with first hole, the first hole being arranged along the radial direction of the valve body and the second hole being arranged along the axial direction of the valve body;
   a control component controlling the liquid medium to flow through the valve body, one end of the control component blocking the second hole under the pressure of the liquid medium, and the other end of the control component passing through the second plug to be exposed to air;
   characterized in that the double-lift rigid gas spring further comprises: a hollow piston rod, one end of the hollow piston rod being fixed with a first separator piston, the first separator piston being matched in the inner cylinder tube, the first separator piston being provided with a through hole for communicating the hollow piston rod and the inner cylinder tube, and the other end of the hollow piston rod extending outside the outer cylinder tube after passing through the inner cylinder tube and the first plug in turn; and
   a piston rod, one end of the piston rod being fixed with a second piston and located in the hollow piston rod and the other end of the piston rod being exposed to air after passing through the hollow piston rod.

2. The double-lift rigid gas spring according to claim 1, characterized in that: the double-lift rigid gas spring further comprises a third piston, the third piston is located in the hollow piston rod and the third piston is sleeved on the piston rod.

3. The double-lift rigid gas spring according to claim 1, characterized in that: one end of the first separator piston connected with the hollow piston rod is provided with an axial extension portion, and the axial extension portion is inserted into the hollow piston rod.

4. The double-lift rigid gas spring according to claim 1, characterized in that: the control component comprises a rod shaped valve core and a switch, and one end of the valve core presses against one end of the switch.

* * * * *